US007689506B2

(12) United States Patent
Fei et al.

(10) Patent No.: US 7,689,506 B2
(45) Date of Patent: Mar. 30, 2010

(54) SYSTEM AND METHOD FOR RAPID UPDATING OF CREDIT INFORMATION

(75) Inventors: Huchen Fei, Newark, DE (US); Dong Yang, Newark, DE (US); Xiao Hong, Hockessin, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 2045 days.

(21) Appl. No.: 10/163,301

(22) Filed: Jun. 7, 2002

(65) Prior Publication Data

US 2003/0018549 A1 Jan. 23, 2003

Related U.S. Application Data

(60) Provisional application No. 60/296,135, filed on Jun. 7, 2001.

(51) Int. Cl.
G06Q 40/00 (2006.01)
(52) U.S. Cl. .................................................. 705/39
(58) Field of Classification Search .............. 705/38–42
See application file for complete search history.

(56) References Cited

U.S. PATENT DOCUMENTS

| | | |
|---|---|---|
| 3,938,091 A | 2/1976 | Liu |
| 4,321,672 A | 3/1982 | Thomson |
| 4,567,359 A | 1/1986 | Lockwood |
| 4,633,397 A | 12/1986 | Macco |
| 4,695,880 A | 9/1987 | Johnson |
| 4,696,491 A | 9/1987 | Stenger |
| 4,713,761 A | 12/1987 | Sharpe |
| 4,725,719 A | 2/1988 | Roach |
| 4,823,264 A | 4/1989 | Deming |
| 4,882,675 A | 11/1989 | Nichtberger |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,157,717 A | 10/1992 | Hitchcock |
| 5,220,501 A | 6/1993 | Lawlor |
| 5,265,033 A | 11/1993 | Vajk |

(Continued)

OTHER PUBLICATIONS eCharge, eCharge Corporation, www.echarge.com, Dec. 3, 1999.

(Continued)

*Primary Examiner*—Hani Kazimi
(74) *Attorney, Agent, or Firm*—Hunton & Williams LLP

(57) ABSTRACT

According to one embodiment, the invention relates to a system and method for evaluating the creditworthiness of an account holder of a credit account comprising the steps of determining, at least once a day, whether a first data set relating to the creditworthiness of the account holder has been received from a credit reporting organization; determining, at least once a day, whether a second data set relating to transaction activity of the credit account has been received; periodically receiving from a credit reporting organization a third data set relating to the creditworthiness of the account holder; periodically receiving a fourth data set relating to the historical activity of the credit account; and using the first and second data sets, to the extent they have been received, and the third and fourth data sets to determine a measure of creditworthiness.

13 Claims, 6 Drawing Sheets

U.S. PATENT DOCUMENTS

| | | |
|---|---|---|
| 5,317,683 A | 5/1994 | Hager |
| 5,321,841 A | 6/1994 | East |
| 5,351,186 A | 9/1994 | Bullock |
| 5,412,708 A | 5/1995 | Katz |
| 5,420,405 A | 5/1995 | Chasek |
| 5,424,938 A | 6/1995 | Wagner |
| 5,446,740 A | 8/1995 | Yien |
| 5,450,537 A | 9/1995 | Hirai |
| 5,467,269 A | 11/1995 | Flaten |
| 5,473,143 A | 12/1995 | Vak |
| 5,473,732 A | 12/1995 | Change |
| 5,485,370 A | 1/1996 | Naylor |
| 5,511,117 A | 4/1996 | Zazzera |
| 5,532,920 A | 7/1996 | Hartrick |
| 5,537,314 A | 7/1996 | Kanter |
| 5,537,473 A | 7/1996 | Kaku |
| 5,544,086 A | 8/1996 | Davis |
| 5,557,518 A | 9/1996 | Rosen |
| 5,568,489 A | 10/1996 | Yien |
| 5,570,465 A | 10/1996 | Tsakanikas |
| 5,590,197 A | 12/1996 | Chen |
| 5,592,560 A | 1/1997 | Deaton |
| 5,594,837 A | 1/1997 | Noyes |
| 5,598,557 A | 1/1997 | Doner |
| 5,606,496 A | 2/1997 | D'Agostino |
| 5,611,052 A | 3/1997 | Dykstra et al. |
| 5,621,789 A | 4/1997 | McCalmont |
| 5,621,812 A | 4/1997 | Deaton |
| 5,625,767 A | 4/1997 | Bartell |
| 5,634,101 A | 5/1997 | Blau |
| 5,638,457 A | 6/1997 | Deaton |
| 5,644,493 A | 7/1997 | Motai |
| 5,652,786 A | 7/1997 | Rogers |
| 5,653,914 A | 8/1997 | Gruener |
| 5,657,383 A | 8/1997 | Gerber |
| 5,659,165 A | 8/1997 | Jennings |
| 5,664,115 A | 9/1997 | Fraser |
| 5,675,662 A | 10/1997 | Deaton |
| 5,684,870 A | 11/1997 | Maloney |
| 5,710,887 A | 1/1998 | Chelliah |
| 5,710,889 A | 1/1998 | Clark |
| 5,727,163 A | 3/1998 | Bezos |
| 5,734,838 A | 3/1998 | Robinson |
| 5,740,231 A | 4/1998 | Cohn |
| 5,754,840 A | 5/1998 | Rivette |
| 5,758,328 A | 5/1998 | Giovannoli |
| 5,761,647 A | 6/1998 | Boushy |
| 5,761,661 A | 6/1998 | Coussens |
| 5,774,122 A | 6/1998 | Kojima |
| 5,778,178 A | 7/1998 | Arunachalam |
| 5,784,562 A | 7/1998 | Diener |
| 5,790,650 A | 8/1998 | Dunn |
| 5,790,785 A | 8/1998 | Klug |
| 5,793,861 A | 8/1998 | Haigh |
| 5,794,221 A | 8/1998 | Egendorf |
| 5,794,259 A | 8/1998 | Kikinis |
| 5,796,395 A | 8/1998 | De Hond |
| 5,802,498 A | 9/1998 | Comesanas |
| 5,802,502 A | 9/1998 | Gell |
| 5,815,657 A | 9/1998 | Williams |
| 5,815,683 A | 9/1998 | Vogler |
| 5,819,092 A | 10/1998 | Ferguson |
| 5,819,285 A | 10/1998 | Damico |
| 5,826,241 A | 10/1998 | Stein |
| 5,826,245 A | 10/1998 | Sandberg-Diment |
| 5,826,250 A | 10/1998 | Trefler |
| 5,832,476 A | 11/1998 | Tada |
| 5,835,580 A | 11/1998 | Fraser |
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West |
| 5,845,260 A | 12/1998 | Nakano |
| 5,847,709 A | 12/1998 | Card |
| 5,848,427 A | 12/1998 | Hyodo |
| 5,862,223 A | 1/1999 | Walker |
| 5,870,456 A | 2/1999 | Rogers |
| 5,870,724 A | 2/1999 | Lawlor |
| 5,873,072 A | 2/1999 | Kight |
| 5,878,403 A | 3/1999 | DeFrancesco et al. |
| 5,884,032 A | 3/1999 | Bateman |
| 5,884,288 A | 3/1999 | Chang |
| 5,889,863 A | 3/1999 | Weber |
| 5,892,900 A | 4/1999 | Ginter |
| 5,898,780 A | 4/1999 | Liu |
| 5,903,881 A | 5/1999 | Schrader |
| 5,914,472 A | 6/1999 | Foladare |
| 5,915,244 A | 6/1999 | Jack |
| 5,918,214 A | 6/1999 | Perkowski |
| 5,918,217 A | 6/1999 | Maggioncalda |
| 5,918,239 A | 6/1999 | Allen |
| 5,926,812 A | 7/1999 | Hilsenrath |
| 5,933,816 A | 8/1999 | Zeanah |
| 5,933,817 A | 8/1999 | Hucal |
| 5,933,823 A | 8/1999 | Cullen |
| 5,933,827 A | 8/1999 | Cole et al. |
| 5,940,812 A | 8/1999 | Tengel |
| 5,952,641 A | 9/1999 | Korshun |
| 5,953,710 A | 9/1999 | Fleming |
| 5,958,007 A | 9/1999 | Lee |
| 5,960,411 A | 9/1999 | Hartman |
| 5,963,952 A | 10/1999 | Kent |
| 5,963,953 A | 10/1999 | Cram |
| 5,969,318 A | 10/1999 | Mackenthun |
| 5,970,482 A | 10/1999 | Pham |
| 5,982,370 A | 11/1999 | Kamper |
| 5,991,751 A | 11/1999 | Rivette |
| 5,991,780 A | 11/1999 | Rivette |
| 5,995,948 A | 11/1999 | Whitford |
| 5,999,907 A | 12/1999 | Donner |
| 6,005,939 A | 12/1999 | Fortenberry |
| 6,012,088 A | 1/2000 | Li |
| 6,014,636 A | 1/2000 | Reeder |
| 6,014,638 A | 1/2000 | Burge |
| 6,018,714 A | 1/2000 | Risen |
| 6,026,429 A | 2/2000 | Jones |
| 6,029,149 A | 2/2000 | Dykstra et al. |
| 6,032,147 A | 2/2000 | Williams |
| 6,049,835 A | 4/2000 | Gagnon |
| 6,055,637 A | 4/2000 | Hudson |
| 6,061,665 A | 5/2000 | Bahreman |
| 6,064,987 A | 5/2000 | Walker |
| 6,081,810 A | 6/2000 | Rosenzweig |
| 6,088,683 A | 7/2000 | Jalili |
| 6,088,686 A | 7/2000 | Walker et al. |
| 6,088,700 A | 7/2000 | Larsen |
| 6,098,070 A | 8/2000 | Maxwell |
| 6,112,181 A | 8/2000 | Shear |
| 6,112,190 A | 8/2000 | Fletcher et al. |
| 6,131,810 A | 10/2000 | Weiss |
| 6,134,549 A | 10/2000 | Regnier |
| 6,144,948 A | 11/2000 | Walker |
| 6,148,293 A | 11/2000 | King |
| 6,170,011 B1 | 1/2001 | Macleod Beck |
| 6,185,242 B1 | 2/2001 | Arthur |
| 6,189,029 B1 | 2/2001 | Fuerst |
| 6,195,644 B1 | 2/2001 | Bowie |
| 6,201,948 B1 | 3/2001 | Cook |
| 6,202,053 B1 | 3/2001 | Christiansen et al. |
| 6,311,169 B2 | 10/2001 | Duhon |
| 2001/0054003 A1 | 12/2001 | Chien |
| 2002/0010599 A1 | 1/2002 | Levison |

2002/0077964 A1* 6/2002 Brody et al. .................. 705/38

OTHER PUBLICATIONS

Tracy Pletz et al., Summary of the at your risk architecture, Jun. 3, 1999.
Siebel, Siebel: Ensuring Customer Success, www.siebel.com, Nov. 17, 1999.
OMG, Welcome to OMG's CORBA for Beginners Page!, www.omg.com, May 25, 1999.
Sun MicroSystems, Inc., Schema for Representing CORBA Objects in an LDAP directory, May 21, 1999.
OMG, Library, www.omg.com, May 25, 1999.
OMG, What is CORBA?, , www.omg.com, May 25, 1999.
Overview of CORBA, www.omg.com, May 25, 1999.
Java, Java™ Technology in the Real World, java.sun.com, May 21, 1999.
Java, Java™ Servlet API, java.sun.com, May 21, 1999.
Java, Staying in Touch with JNDI, java.sun.com, May 21, 1999.
Java, Java™ Remote Method Invocation (RMI) Interface, java.sun.com, May 21, 1999.
Java, Banking on Java™ Technology, java.sun.com, May 21, 1999.
Java, The JDBC™ Data Access API, java.sun.com, May 21, 1999.
Anne Thomas, Enterprise Javabeans™ Technology: Server Component Model for the Java™ platform, java.sun.com, May 21, 1999.
S. R. Hiremath, Numerical Credit Scoring Model, Operations Research Bulletin, WA13.16, Apr. 30, 1975.
Reuters, Getting Smart with Java: Sun Micro Says American Express to Use Java for Smart Card, www.abcnew.go.com/sciences/tech, Jun. 6, 2000.
David Bank, Cash, Check, Charge—What's Next?, Seattle Times, Mar. 6, 1998.
Gerry Vandenengel, Cardson the Internet: Advertising on a $3 Bill, Industry Intelligence, Feb. 1, 1995.
Kim A. Strassel, Dutch Software Concern Experiments with Electronic 'Cash' in Cyberspace, Wall Street Journal, Apr. 17, 1995.
Jeffrey Kutler, Cash Card Creator Looking Beyond Mondex, Feb. 9, 1995.
David Post, E-Cash: Can't Live With It, Can't Live Without It, The American Lawyer, pp. 116-117, Mar. 1, 1996.
Russell Mitchell, Cyberspace: Crafting Software . . . , Business Week, pp. 78-86, Feb. 27, 1995.
Jeffrey Kutler, A Different Drummer on the Data Highway, American Banker, May 12, 1995.
Stephen Eppmt, A pLayer Goes After Big Bucks in Cyberspace, American Banker, May 5, 1995
Robert Barnham, Network Brings Together Producers and Companies, Bests Review Feb. 1, 1994.
Vanessa Houlder, OFT Gives the Individual Top Priority: Report Calls for Deregulation of Business Lending, The Financial Times, Jun. 8, 1994.
Kennedy Maiz, Fannie Mae on the Web, Newsbyte, May 8, 1995.
Anne Knowles, Improved Internet Security Enabling On-Line Commerce, PC Week, Mar. 20, 1995.
Aversion Therapy: Banks Overcoming Fear of the Net to Develop Safe Internet-based Payment System w/ Netscape Communicator, Network World, Dec. 12, 1994.
Don Clark, Microsoft, Visa to Jointly Develop PC Electronic-Shopping Software, Wall Street Journal, The, B9, Nov. 9, 1994.
Understanding Product Data Management, Hewlett-Packard Company, Apr. 26, 1999.
Getting Started: Specific GE TPN Post Service Use Guidelines, GE, Apr. 26, 1999.
Resource Center: Consolidated Edison Selects GE TPN Post, GE, Apr. 26, 1999.
ThomasNet, Thomas Publishing Company, Apr. 26, 1999.
SoluSource: For Engineers by Engineers, Thomas Publishing Company, Apr. 26, 1999.
Harris InfoSource, Apr. 26, 1999.
Welcome to MUSE, MUSE Technologies, Apr. 26, 1999.
Product Data Intgration Technologies, Inc., PDIT, Apr. 26, 1999.
SBA: Pro-Net, SBA, Apr. 1, 1999.
FreeMarkets, FreeMarkets Online, Inc., Apr. 26, 1999.
Associates National Bank (DE) Credit Card Services, The Associates, www.theassocitheassociates.atescomcorn/consumer/credit_cards/main.html, Apr. 6, 1999.
At Your Request, Wingspanbankcom, Sep. 28, 1999.
Robyn Meredith, Internet bank moves closer to virtual reality, USA Today, May 5, 1995.
Marvin Sirbu and J.D. Tygar, NetBill: An Internet Commerce System Optimized for Network Delivered Services, http://www.ini.cmu.edu :80/netbill, pp. 1-12, Feb. 27, 1995.
The check is in the email., Information Today, vol. 12, No. 3, Mar. 1, 1995, ISSN: 8755-6286.
The Gale Group, G&D America's Multi-application Smart Card Selected for Combined Payroll and 'Virtual Banking' Program in Mexico, wysiwyg://0/http://www.dialogclassic.com/history, Business Wire, Apr. 24, 1998, p. 4241047.
Richard Mitchell, Netlink Goes After An Unbanked Niche, wysiwyg://0/http://www.dialogclassic.com/history, ISSN: 1093-1279, Sep. 1999.
"Notification of Transmittal of the International Search Report or the Declaration," mailed Jun. 17, 2003 in PCT/US02/18025.

* cited by examiner

SYSTEM AND METHOD FOR RAPID UPDATING OF CREDIT INFORMATION

The present application claims priority to U.S. Provisional Application No. 60/296,135, filed Jun. 7, 2001, which is incorporated herein by reference in its entirety to the extent that it is consistent with this invention and application.

BACKGROUND OF THE INVENTION

1. Field of the Invention

The invention relates to the field of electronic transactions, and more particularly to techniques for rapidly updating credit scores or other credit information, for instance on a daily or greater basis.

2. Description of the Related Art

The credit card, mortgage, personal credit and other financial sectors rely on a variety of information in reviewing, approving, denying and otherwise evaluating credit and credit risk.

One commercially known metric for assessing credit risk is the mathematical model generated by Fair, Issac and Company (FICO) which assigns consumers a normative score based on credit files and other information. Credit files themselves, such as those maintained by the credit reporting organizations (such as Equifax and Experian), may receive updated account payment, balance, delinquency and other information on a periodic basis, which is typically monthly. The First Data Resources Corporation (FDR) likewise commercially handles score calculation generally on a monthly basis. One known FDR risk score is based on historical data of a particular credit card account, including daily transaction data for the account. However, the FDR risk score is not based on credit reporting organization data.

Other methods and systems are known which generate credit scores on a monthly basis using bimonthly data from credit reporting organizations and monthly historical data for a particular account.

Financial institutions such as credit card issuers use the credit scores and data to determine whether and to what extent to extend credit to a consumer. Credit card issuers may rely on automated scoring engines which use the credit scores and data to determine to what extent to extend credit to an existing cardholder. In a certain percentage of cases, the credit card issuer, based on the scoring engine, will extend credit to a consumer who then fails to repay the loan. The profit of a credit card issuer is thus affected by the predictive capability of the scoring engine. A scoring engine which reduces the instances of default by even a small percentage can have a significant effect on the profit of the credit card issuer.

BRIEF SUMMARY OF THE INVENTION

According to one embodiment, the invention relates to a system and method for evaluating the creditworthiness of an account holder of a credit account comprising the steps of determining, at least once a day, whether a first data set relating to the creditworthiness of the account holder has been received from a credit reporting organization; determining, at least once a day, whether a second data set relating to transaction activity of the credit account has been received; periodically receiving from a credit reporting organization a third data set relating to the creditworthiness of the account holder; periodically receiving a fourth data set relating to the historical activity of the credit account; and using the first and second data sets, to the extent they have been received, and the third and fourth data sets to determine a measure of creditworthiness.

According to another embodiment, the invention relates to a system and method for determining the creditworthiness of an account holder comprising the steps of receiving a credit history data set from a credit reporting organization on a periodic basis; receiving an account history data set on a periodic basis; determining, at least once a day, whether a third data set relating to the creditworthiness of the account holder has been received; and using the credit history data set, the account history data set, and the third data set to determine a measure of the creditworthiness of the account holder.

The invention can provide significant advantages in predicting credit risk, due in part to: (a) the utilization of data from a credit reporting organization in addition to data from the account holder's historical behavior in a particular account, and (b) the utilization of long-term reports, e.g., a bimonthly credit reporting organization report, and a monthly account history data set, in addition to daily reports, e.g., a daily credit reporting organization report for significant events and a daily account transaction data set for the latest transaction activity. This information allows the risk model to reflect both historical behavior and very recent behavior in the account holder's entire recorded credit behavior, rather than his or her behavior in one account. The risk model can therefore provide a significant improvement in the accuracy of predicting defaults.

DETAILED DESCRIPTION OF THE INVENTION

The present invention relates to a method and system for evaluating creditworthiness. According to one embodiment, the method and system produce, among other things, a score ranging from 0 to 980 which can be used to decide whether and to what degree to extend credit to a consumer. For example, the score may be used to decide whether to authorize a particular credit transaction, whether to approve or change an account holder's credit limit, or what terms to offer in reissuing an account. The score is derived from data relating to the creditworthiness of a particular account holder, which data may be maintained by one or more entities.

Figure 1:
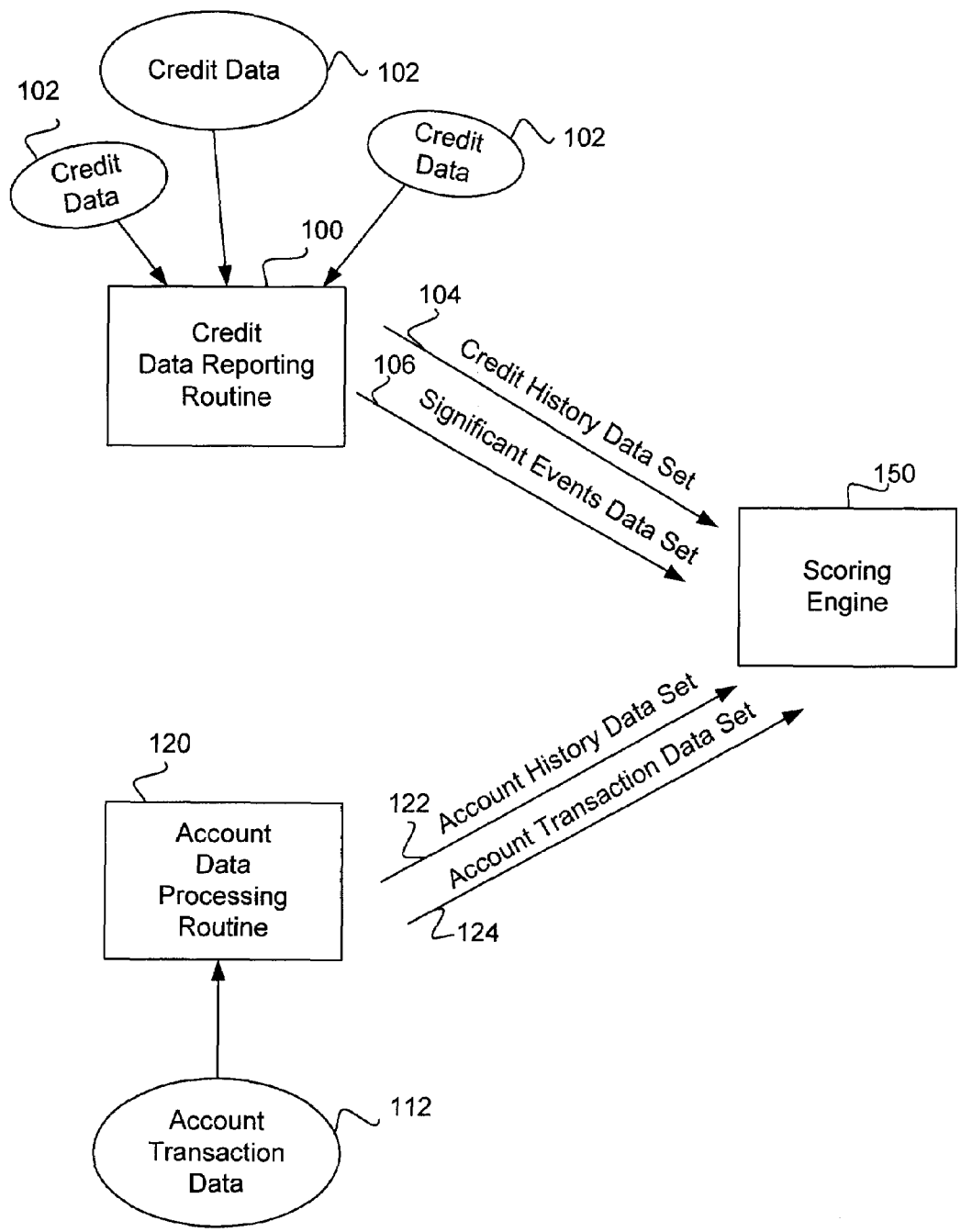
FIG. 1 illustrates a method for evaluating creditworthiness according to one embodiment of the invention.

FIG. 1 is a diagram which illustrates a system and method for evaluating creditworthiness according to one embodiment of the invention. As shown in FIG. 1, the system and method include a scoring engine 150 which outputs a score indicative of creditworthiness. The scoring engine 150 receives data from a credit data reporting routine 100 and an account data processing routine 120. The credit data reporting routine 100 is typically carried out by one or more credit reporting organizations (also sometimes referred to as credit bureaus) such as Experian, TransUnion, and Equifax. The credit reporting organizations have agreements with various creditors under which the creditors provide credit data 102 to the credit reporting organizations relating to the behavior of the creditor's account holders. Such agreements enable the credit reporting organizations to compile credit reports in various forms which include detailed information about the credit behavior of account holders. The credit report for a particular person or entity typically includes data from many credit accounts, e.g., mortgage, auto loan, credit card, school loan, etc.

The credit reporting organizations offer credit reports in a standard format to consumers for a fee. The credit reporting organizations may also provide credit reports in a customized format for creditors such as banks issuing credit cards. For example, as shown in FIG. 1, the credit report generation involves the generation of two customized credit reports, a credit history data set 104 and a significant events data set 106.

As shown in FIG. 1, a second portion of the system and method for evaluating creditworthiness involves an account data processing routine 120. The account data processing routine 120 involves, among other things, receiving account transaction data 112 (e.g., data relating to credit card purchases) from merchants and manipulating or processing the account transaction data 112 into a format which is useful for predicting creditworthiness. For example, as will be described below, the account data processing routine 120 may involve receiving credit card transaction data and generating an account history data set 122 (also sometimes referred to as a "master file"), which may be generated monthly, and an account transactions data set 124, which may be generated daily. The account history data set 122 and the account transactions data set 124 are used as input to the scoring engine 150.

The account data processing routine 120 typically receives account transaction data 112 relevant to a single account, such as a credit card account provided by a bank issuing credit cards. The account transaction data 112 may be supplied, for example, by an entity which processes credit card transactions, commonly referred to as "the acquiring processor."

The account data processing routine 120 may be executed on a computer system maintained by the account provider, e.g., the credit card issuing bank. The credit card issuing bank receives the account transaction data 112 and creates and maintains the account history data set 122 and the account transactions data set 124. However, if desired, these functions may also be handled by a separate account data processing entity. The account data processing entity may be, for example, an entity such as First Data Resources Corporation (FDR) which provides credit and debit card processing services to financial institutions such as banks which issue credit and debit cards.

A third portion of the system and method shown in FIG. 1 for evaluating creditworthiness involves a scoring engine 150 which, as will be described below, includes at least one risk model. The risk model is a routine which typically receives as input a credit history data set 104, a significant events data set 106, an account history data set 122, and an account transactions data set 124, and which outputs a score indicative of creditworthiness from 0 to 980, with 980 being the highest credit risk. However, the risk score can be based on any desired combination of input data sets 104, 106, 122, 124.

Figure 2:
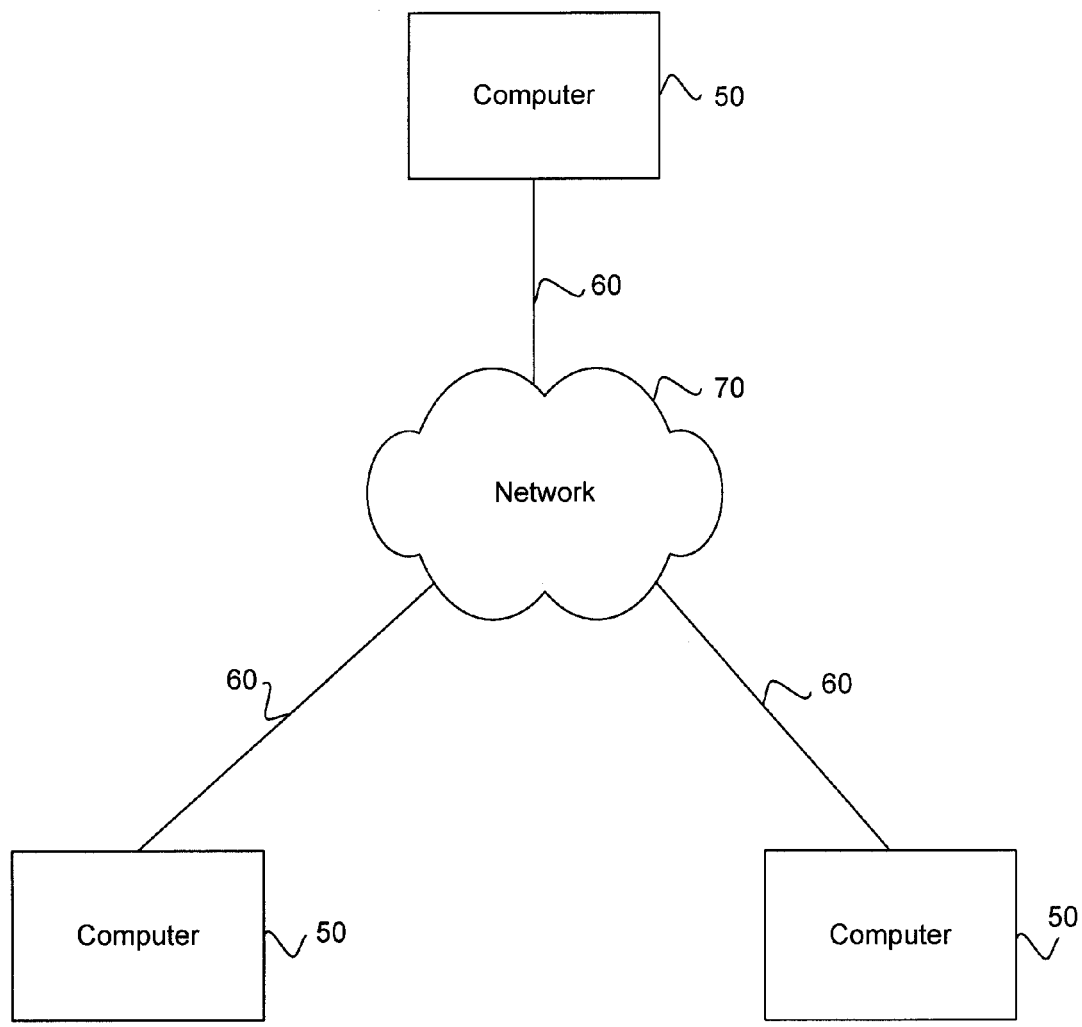
FIG. 2 illustrates an example of a system which can be used to carry out a method according to an exemplary embodiment of the invention.

The processes depicted in FIG. 1 can be carried out on a system as shown in FIG. 2 which includes computers or computing devices 50, such as server computers, connected via a communication links 60 to a network 70 such as the internet. The computers 50 are programmed to exchange information via the network 70. The computers 50 each typically include a database for storing information. Each computer 50 may be adapted to send and receive information to multiple users over a network, as is well known in the art.

The data files which provide input to the scoring engine 150 will now be described with reference to FIG. 1. Typically, the credit history data set 104 and the significant events data set 106 are generated by one or more credit reporting organizations. The account history data set 122 and the account transactions data set 124 may be generated by the financial institution which issues the account, e.g., a credit card issuer, or may be generated by another entity which processes the account information.

The credit history data set 104 typically comprises a borrower-specific file which includes data on the borrower's historical credit behavior. The data are typically derived from multiple creditors and accounts, e.g., mortgage, auto loan, school loan, credit card, etc. Examples of variables which may be included in the credit history data set 104 include: current balance, repayment schedule, lateness history, delinquency, age of account, number of various accounts, open date of various accounts, lateness information, if any, of various accounts, credit limit of various accounts, loan amount of various accounts, etc. The credit history data set 104 is typically transmitted periodically, e.g., every two months, by the credit reporting organization to the entity running the scoring engine 150, e.g., a bank issuing credit cards.

The significant events data set 106 contains data derived from multiple creditors and accounts relating to events which are significant to a person's creditworthiness. For example, the significant events data set 106 may include recent changes in account balance over a certain dollar amount, bankruptcy filing, a delinquency greater than an arbitrary time period, receipt of an arbitrary payment amount, credit inquiries, new account openings, etc.

The significant events data set 106 is typically maintained by a credit reporting organization and may be sent to the entity running the scoring engine 150 on a daily basis in the event that there is a new significant event to report. In the case of no new significant event, the significant event data set 106 is either not delivered or contains a null value representing the absence of a new significant event.

The other two data sets, i.e., the account history data set 122 and the account transactions data set 124 contain data relating to a particular credit account of the account holder. The account history data set 122 may contain a number of variables related to the account activity and characteristics for a particular holder of an account. The account history data set 122 may contain a relatively large amount of data, because the creditor is the entity which provides the account to the account holder and thus has typically maintained detailed records of the account holder and account activity over an extended time period.

Examples of variables which may be included in the account history data set 122 include total transaction dollars, number of transactions, payment amount, lateness, merchant balance, cash balance, balance transfer amount, cardmember service (CMS) calling information (e.g., information on calls made by cardmembers to CMS such as number of calls, time of calls, subject matter of calls), etc. The account history data set 122 may be generated on a monthly basis, for example, and may contain data relevant to the previous 12 months of account activity.

The account transactions data set 124 typically contains data on recent credit card transactions. It contains such information as amount of transaction, merchant, date and time of transaction, location of merchant, type of merchant, available credit at the time, etc. According to one embodiment, the account transactions data set 124 is generated on a daily basis and used as input to the scoring engine 150.

Figure 3:
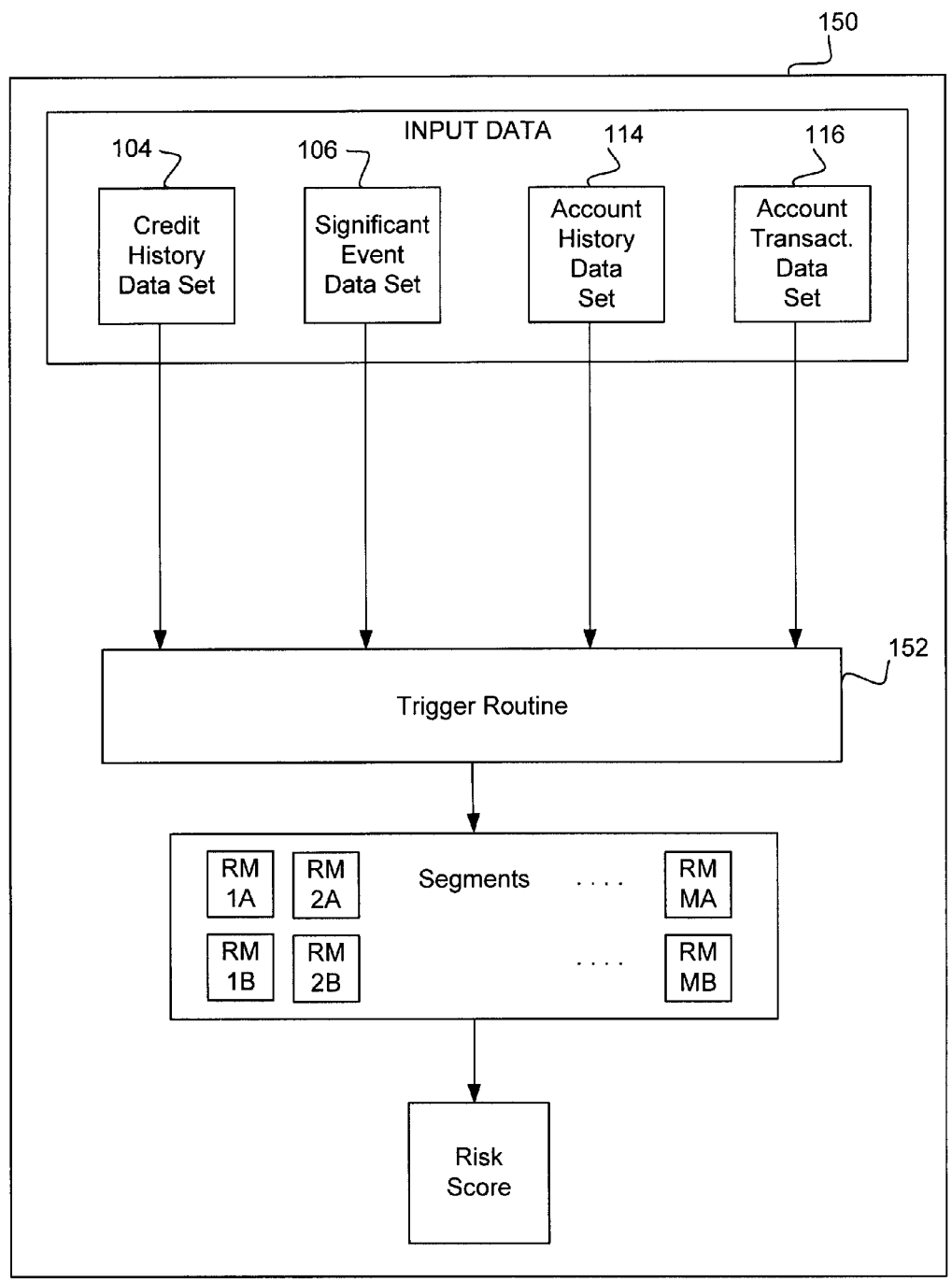
FIG. 3 illustrates a scoring engine which may be used in practicing the method shown in FIG. 1 according to an exemplary embodiment of the invention.

The scoring engine 150, as shown in FIG. 3, receives the input data sets 104, 106, 122 and 124 and outputs a score indicative of the creditworthiness of the account holders. As a preliminary step, a trigger routine 152, as shown in FIG. 3, may be executed to determine whether a particular account needs to be scored. The process of scoring an account has a cost associated with it. For example, if the scoring process is performed by an entity retained for that purpose, the entity will typically charge a fee based on the number of accounts scored. Whether the scoring is performed in-house or by a third party, the computer resources and file transfer process will have an associated cost, which may be avoided by the triggering routine.

According to an exemplary embodiment of the invention, the triggering routine 152 is executed initially to determine whether the account data has changed in such a manner or extent as to justify the cost of scoring a particular account. The triggering routine involves examining one or more variables, typically existing in the significant events data set 106 or the account transactions data set 124. For example, the triggering routine 152 may check these data sets to ascertain whether a payment has been received, a payment reversal has taken place (e.g., a bounced check), an authorization has been granted over a certain dollar amount, a balance change greater than a certain amount has taken place, or one of the events in the significant events file 106 has occurred. The triggering routine may also examine a "cycle" variable in the account history data set 122 which forces the calculation of a score at least once every specified cycle in the event that no other triggers have caused a score to be calculated.

Figure 4:
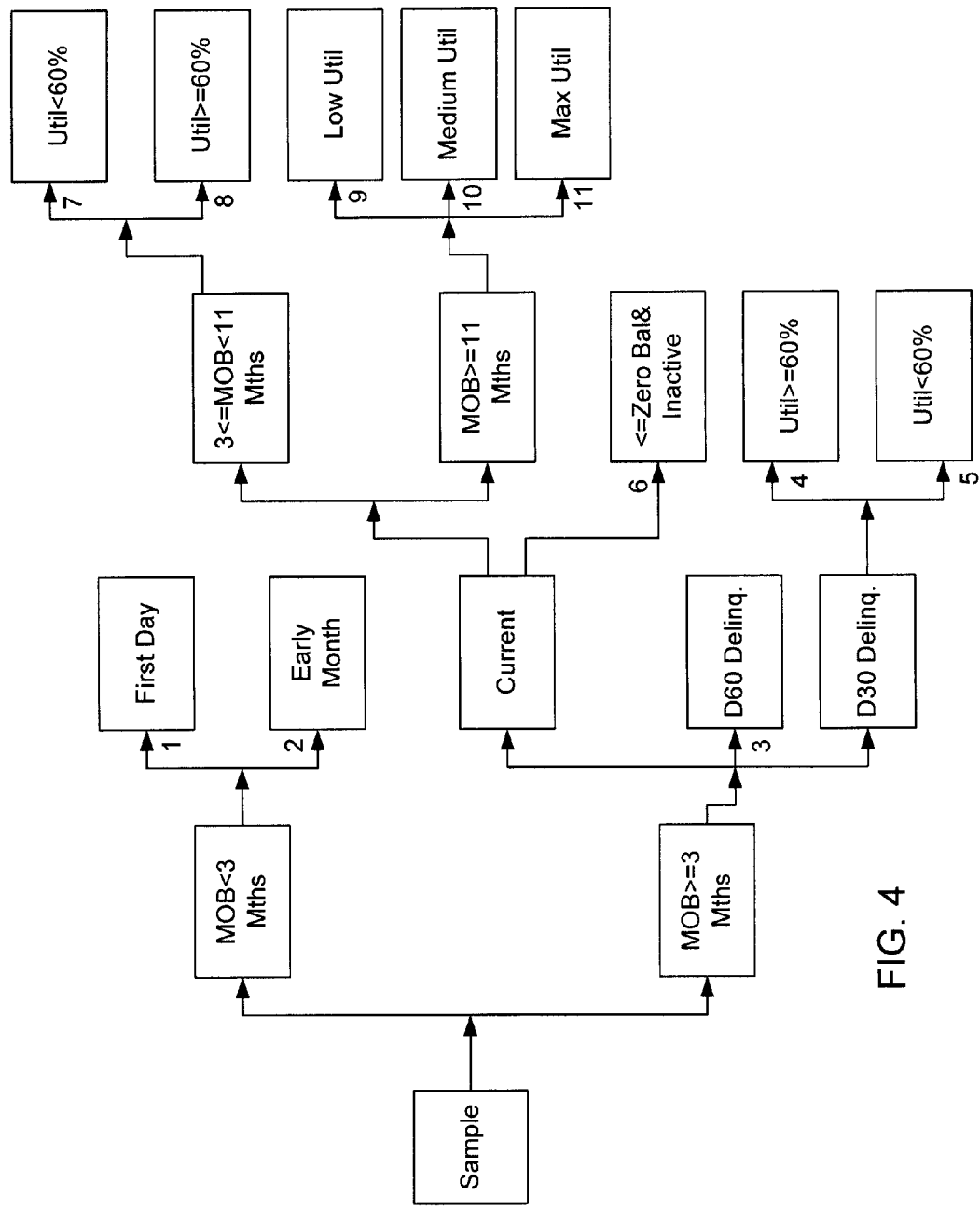
FIG. 4 shows an example of a number of account holder segments which can be used in connection with the scoring engine of FIG. 3 according to an exemplary embodiment of the invention.

To enhance the predictive capability of the scoring engine 150, a number of different risk models may be constructed which correspond to different segments of the account holder population. The segments are defined by the behavior of the account holders. For example, as shown in FIG. 4, the account holder population may be segmented based on the age of the account (i.e., the "Months on Book" or MOB), whether the account is current, delinquent 30 days, or delinquent 60 days, the utilization of the credit line ("Util", which refers to the balance of the account at a specified time divided by the credit limit), and whether the account has a zero balance and is inactive. For relatively new accounts (e.g., Months on Book<3 months), as shown in FIG. 4, a first segment may be defined for first day accounts ("First Day"), and a second segment may be defined for accounts having an age of 2 days through the end of the second month ("Early Month").

After the account holder is classified into a particular segment, the risk model for that segment is utilized to generate a risk score, for example on a scale of 0 to 980. A number of risk models are constructed in order to enhance the predictive capability of the scoring engine. Each risk model is designed to predict risk with respect to a particular segment of the account holder population.

For example, segment 1 may be defined for first day accounts. If credit reporting organization data is not available for a particular account holder, then the score may be based on total first day transactions amount and open-to-buy amount (i.e., credit limit minus total transactions amount). If credit reporting organization data is available, then the number of active accounts (also sometimes referred to as active "trades"), amount of retail accounts, and total revolving accounts balance may also be used for scoring.

The risk models typically take the following form:

$$\text{Score} = \exp(a_1 x_1 + \ldots + a_n x_n)/[1 + \exp(a_1 x_1 + \ldots + a_n x_n)]$$

where the variables $x_1, x_2, \ldots, x_n$ are the parameters discussed above (e.g., total revolving accounts balance, amount of retail accounts, etc.), and the coefficients $a_1, a_2, \ldots, a_n$ are chosen according to desired criteria of the account provider.

Referring again to FIG. 3, each segment may have two risk models associated with it. For example, in FIG. 3, segment 1 has risk models RM 1A and RM 1B, segment 2 has risk models RM 2A and RM 2B, and so on. The first risk model, e.g., RM 1A is constructed to receive as input the credit history data set 104, the significant events data set 106, the account history data set 122, and the account transactions data set 124. The second risk model, e.g., RM 1B, may be constructed for those account holders who have no credit history data set 104 or significant events data set 106, for example because the credit reporting organization has no records of their credit history.

Once the correct segment is ascertained, data from the input data sets is used as input to the scoring engine 150 to calculate a risk score. The risk score is typically based on a significant amount of historical data from the credit history data set 104 and account history data set 122. The risk score is also typically based on very recent data from the significant events data set 106 and the account transactions data set 124. Due to the combination of a significant amount of historical data and very recent data, the risk model is thus able to provide improved accuracy in predicting credit risk. The inclusion of recent data, for example, allows the issuing bank to deny credit to any account exhibiting recent activity indicative of increased credit risk.

Figure 5:
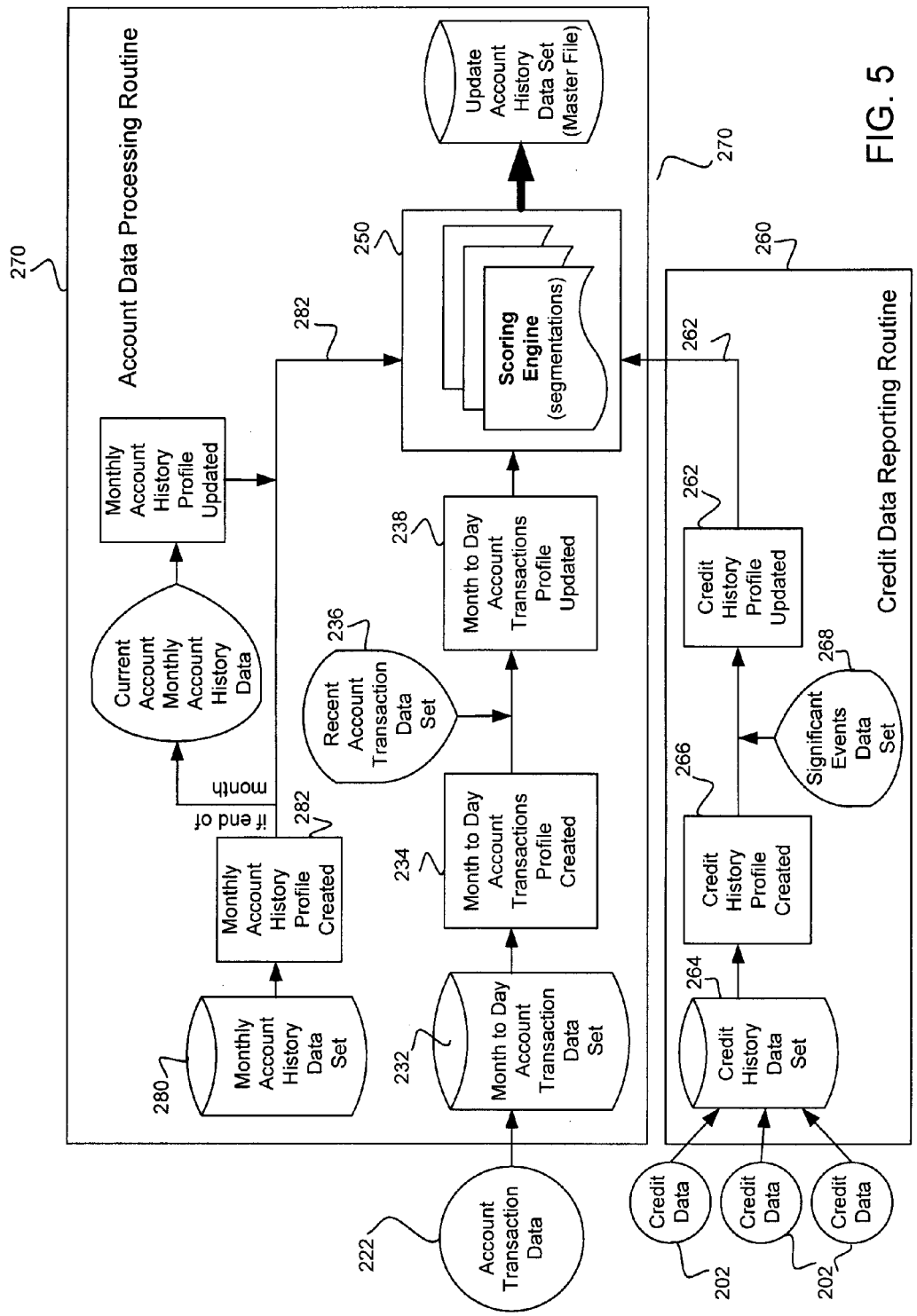
FIG. 5 illustrates a method for evaluating creditworthiness according to another embodiment of the invention.

FIG. 5 is a diagram which illustrates a system and method for evaluating creditworthiness according another embodiment of the invention. As shown in FIG. 5, the system and method include a scoring engine 250 which outputs a score indicative of creditworthiness. The scoring engine 250, which may be part of an account data processing routine 270, receives input data 262 from a credit data reporting routine 260 and receives input data 238, 282 generated in the account data processing routine 270.

The credit data reporting routine 260 provides data 262 relating to the credit history and creditworthiness of the account holder. The credit data reporting routine 260 may be executed by a credit reporting organization, for example, which provides a customized data set to the issuing bank. The account data processing routine 270 processes historical data for the particular accounts of the account provider (e.g., the bank issuing credit cards). The account data processing routine 270 may be executed by a credit card issuing bank, for example, or it may be executed by a separate processing entity which the credit card issuing bank retains to process the account transactions of the bank's account holders.

The scoring engine 250 includes at least one risk model, and typically includes a number of risk models corresponding to a number of segments of the account holder population, as described above with reference to FIG. 4. The functions and processes depicted in FIG. 5 can be carried out on the system shown in FIG. 2. The process of generating the files 262, 238, 282 which are input to the scoring engine 250 will now be described with reference to FIG. 5.

The credit reporting organization receives credit data 202 relevant to particular borrowers from a number of creditors which have agreements with the credit reporting organization to provide such data. The credit reporting organization uses the credit data 202 to create a credit history data set 264 on a periodic basis, for example monthly. The credit history data set 264 typically contains the same variables described above with respect to the credit history data set 104.

The next step in the credit data reporting routine 260 involves the creation of a credit history profile 266 from the credit history data set 264. The credit history profile 266 summarizes the data in the credit history data set 264 using a set of derived variables called profilers. The profilers are generated from the credit history data set 264 using weight functions or ratios. Each profiler routine comprises an algorithm which takes as input certain variables of the credit history data set 264 and which outputs a real number. For example, "debt burden ratio" is an example of a profiler, defined as the total revolving balance divided by the highest bankcard credit line limit. Another example of a profiler is the "average revolving balance velocity," which may be defined as total credit balance divided by the average age of bankcard accounts. The profilers can be constructed according any desired criteria of the account provider.

In general, the profilers summarize the data in the credit history data set 264 and therefore can be updated with current data using less computer resources than would be required to update the credit history data set 264, which may be a relatively large file. Consequently, the profilers facilitate the transmission of updated credit history data to the scoring engine 250 at a relatively high frequency, e.g., daily.

In the next step of the credit data reporting routine 260, the credit reporting organization reports significant events in a significant events data set 268. The significant events data set 268 contains data derived from multiple creditors and accounts relating to events which are significant to a person's creditworthiness. For example, the significant events data set 268 may include changes in account balance over a certain dollar amount, bankruptcy filing, a delinquency greater than an arbitrary time period, receipt of an arbitrary payment amount, lateness, inquiries, etc. The significant events data set 260 typically contains the same variables described above with respect to data set 106.

The significant events data set 268 is used to update the credit history profile 266. The credit history profile 266 is updated by applying a weight function to the significant events data set 268 and to the previous credit history profile 266. The updated credit history profile 262 thus is based in part on recent, e.g., daily, data relating to significant events in the credit history of the account holders. The updated credit history profile 262 is used as input to the scoring engine 250.

Referring now to the account data processing routine 270, that routine involves, among other things, receiving account transaction data 222 (e.g., data relating to credit card purchases) from merchants, typically via an acquiring processor, and manipulating or processing the account transaction data 222 into a format which is useful for predicting creditworthiness. The account data processing routine 270 generates an account history profile 282 on a periodic basis, e.g., monthly, and an updated account transactions profile 238 on a periodic basis, e.g., daily, which are input to the scoring engine 250.

The account transaction data 222 received by the account data processing routine 270 typically comprises data on transactions of only the accounts provided by the account provider running the scoring engine 250. For example, the account transaction data 222 may comprise data on transactions executed by the card holders of an issuing bank's credit cards.

The account transaction data 222 may be supplied, for example, by one or more entities which processes credit card transactions, such as one or more acquiring processors. The entity which runs the account data processing routine 270 uses the account transaction data 222 to create an account transactions data set 232 which contains relatively recent data on account transactions. The account transactions data set 232 typically contains the same variables described above with respect to account transactions data set 124.

Another step in the account data processing routine 270 involves the creation of an account transactions profile 234 from the account transactions data set 232. The account transactions profile 234 summarizes the data in the account transactions data set 232 using a set of derived variables called profilers, as described above. The profilers may be generated from the account transactions data set 232 using weight functions. Each profiler routine comprises an algorithm which takes as input certain variables of the account transactions data set 232 and which outputs a real number. The profilers summarize the data in the account transactions data set 232 and therefore can be updated with current data using less computer resources than would be required to update the account transactions data set 232, which may be typically a relatively large file. Consequently, the profilers facilitate the transmission of updated account transactions data to the scoring engine 250 at a relatively high frequency, e.g., daily. As described above, the profilers for the account data processing routine 270 can be constructed according any desired criteria of the account provider.

In another step of the account data processing routine 270, a recent account transactions data set 236 is received from one or more acquiring processors and used to update the account transactions profile 234. The recent account transactions data set 236 contains data relevant to recently executed credit card transactions, such as amount of transaction, date and time of transaction, merchant, location of merchant, type of merchant, available credit at the time, etc.

The account transactions profile 234 is updated by applying a weight function to the recent account transactions data 236 and the previous account transactions profile 234. The updated account transactions profile 238 thus is based in part on recent, e.g., daily, data relating to account transactions. The updated account transactions profile 238 is used as input to the scoring engine 250.

FIG. 5 also shows that the account data processing routine 270 periodically (e.g., monthly) generates an account history data set 280 (also known as a "master file") which contains a relatively large number of variables relating to historical activity of the account. The account history data set 280 typically contains the same variables described above with respect to account history data set 122.

The account history data set 280 typically comprises data spanning 12 months, and may be structured as 12 monthly data sets, for example. The account history data set 280 is used to create an account history profile 282 using a number of profiler routines, as described above in connection with the account transactions profile 234. The account history profile 282 is used as input to the scoring engine 250.

If the account data processing routine 270 is being executed at the end of the month, at which time a new entire month of account history data is available, the account history profile 282 is updated with the newly available account history data, as shown in the upper portion of FIG. 5.

The input data to the scoring engine 250 includes the account history profile 282, the account transaction profile 238, and the updated credit history profile 262. As a preliminary step, a trigger routine may be executed to determine whether a particular account needs to be scored, as described above with respect to FIG. 3. For the accounts which trigger scoring, the profilers are the input to the scoring engine 250. As described above, the scoring engine 250 typically includes a number of account holder segments, such as those shown in FIG. 4. The various segments include risk models which are customized for the particular characteristics of the segment population in order to enhance the predictive capabilities of the scoring engine 250. Each segment may have two risk models, a first risk model which receives the account transactions profile 238, the account history profile 282, and the credit history profile 262, and a second risk model which receives only the account transaction profile 238 and the account history profile 282, e.g., because the credit reporting organization has no data on the account holder.

As described above, the risk model is typically of the form:

$$\text{Score} = \exp(a_1x_1 + \ldots + a_nx_n)/[1 + \exp(a_1x_1 + \ldots + a_nx_n)]$$

where the variables $x_1, x_2, \ldots, x_n$ are the profilers discussed above and the coefficients $a_1, a_2, \ldots, a_n$ are chosen according to desired criteria of the account provider.

After the scoring engine 250 has scored the accounts, the account history data set 280 is updated, as shown on the right side of FIG. 5. This update typically involves updating only the latest month of account history data in the account history data set 280.

According to another aspect of the invention, a feature known as a "mimic routine" or "mimic algorithm" may be applied to data in the account history data set 280 according to an exemplary embodiment of the invention. The account history data set 280 enhances the predictive capability of the scoring engine 250 because, among other things, it typically includes data spanning a 12-month period. However, because it is typically a relatively large file, the data processing resources required to process the account history data set 280 on a daily basis can be large.

Accordingly, the inventors have developed mimic routines which produce a single value representative of a plurality of historical values for a particular variable in the account history data set 280. The mimic routines typically have the form of a weighted average:

$$M = 1/n(a_1x_1 + a_2x_2 + a_3x_3 + \ldots + a_nx_n)$$

where the coefficients an represent the weighting factors and the $x_n$ represent the file variables from the account history data set 280. Typically, the most recent month is weighted more heavily than the oldest month. The mimic routines are used in connection with the process of creating and updating the account history profile 282 with the profiler routines. For example, a mimic routine may comprise a portion of a profiler routine.

The mimic routines generally have two forms. The first form converts a plurality of historical values of a particular variable from the account history data set 280 into a single value representative of the entire time span. For example, a mimic routine may take as input 12 monthly values of a account history data set variable and output a single value representative of the 12 monthly values. This process may be repeated for any desired variables in the account history data set 280. The first form is applied initially to data in the account history data set 280 to derive a single value for desired variables having multiple historical values, e.g., 12 monthly values.

One example of the first form of mimic routine relates to a weighted average of the monthly balance amounts. For example, the account history data set 280 may include the monthly balance values Bal(1), Bal(2), ..., Bal(12). A mimic routine may be defined to calculate an "avgbal(12)" variable as follows:

$$avgbal(12) = a_1 * Bal(1) + a_2 * Bal(2) + \ldots + a_{12} * Bal(12)$$

where the coefficients $a_1, a_2, \ldots, a_{12}$ are selected according to any desired criteria, e.g., to maximize the predictive power of avgbal(12).

The second form of mimic routine is used to update a previous output value from a mimic routine based on a new value in a new account history data set 280. In particular, the second form of mimic routine receives two inputs, (1) the output from a previously executed mimic routine, and (2) a new account history data set 280 variable. The second form of mimic routine may also utilize a weighted average of the two values, or other desired equation, to update the output of the mimic routine. According to one example, a mimic routine "avgbal" for month n+1 (the new month) is defined as:

$$avgbal(n+1) = a * avgbal(n) + (1-a) * bal(n+1)$$

where a is the desired weighting factor.

The second form of mimic routine provides the advantage that the previous output of any mimic routine can be easily updated. Thus, initially, the first form of mimic routine may be applied to a number of historical values of a variable in the account history data set 280 to output a single value representative of all the historical values. Next, when a new account history data set 280 is received, e.g., in one month, the second form of mimic routine is used to update the output with the new value from the new account history data set 280.

Besides the two aforementioned general forms of mimic routines, mimic routines may also be used to mimic moving summations and moving maxima/minima, e.g., sum of cash advance in past 12 months, the total number of late fees charged in the past 24 months, the maximum balance in the last 12 months, etc.). These moving sum and moving maxima/minima typically can have significant power in predicting credit risk. The mimic algorithms simulate the moving sum and moving maxima/minima without the need to store all the time series data. The moving summation and moving maxima/minima type of mimic algorithms may be used, for example, as a part of a profiler in the process of creating the account history profile 282.

An example of a summation-type mimic algorithm will now be described. The objective of this exemplary mimic algorithm is to determine SX(t), which is an estimate of (i.e., mimics) SUMX(t). SUMX(t) is defined as:

$$SUMX(t) = \text{sum}(X(t) + X(t-1) + \ldots + X(t-n))$$

where X(t) is the balance at month t. The objective is to calculate SX(t+1) without carrying the variables for the previous n months, as would be required to calculate SUMX. The algorithm involves defining Y(n,t)=X(t−n), which is an estimate of the balance X for the oldest month t−n. SX(t+1) can be determined as follows:

$$SX(t+1) = SX(t) + X(t+1) - Y(t)$$

Y(t) is determined from the following equation:

$$Y(t+1) = a * Y(t) + (1-a) * X(t+1)$$

wherein the factor a=1−1/n. The mimic algorithm thus allows SX, which mimics SUMX, to be calculated without carrying the variables for the previous n months. The value for SX can then be used as part of a profiler, for example to create the account history profile 282.

The risk score output by the risk model is used as a basis for making decisions relating to the extension of credit, such as whether to change an account holder's credit line, whether to authorize a particular credit card transaction, and how to define the terms of new credit accounts in marketing them to prospective account holders. The invention provides significant advantages in predicting credit risk, due in part to: (a) the utilization of data from a credit reporting organization in addition to data from the account holder's historical behavior in a particular account, and (b) the utilization of long-term reports, e.g., a bimonthly credit reporting organization report, and a monthly account history data set, in addition to daily reports, e.g., a daily credit reporting organization report for significant events and a daily account transaction data set for the latest transaction activity. This information allows the risk model to reflect both historical behavior and very recent behavior in the account holder's entire recorded credit behavior, rather than his or her behavior in one account. The risk model can therefore provide a significant improvement in the accuracy of predicting defaults.

Figure 6:
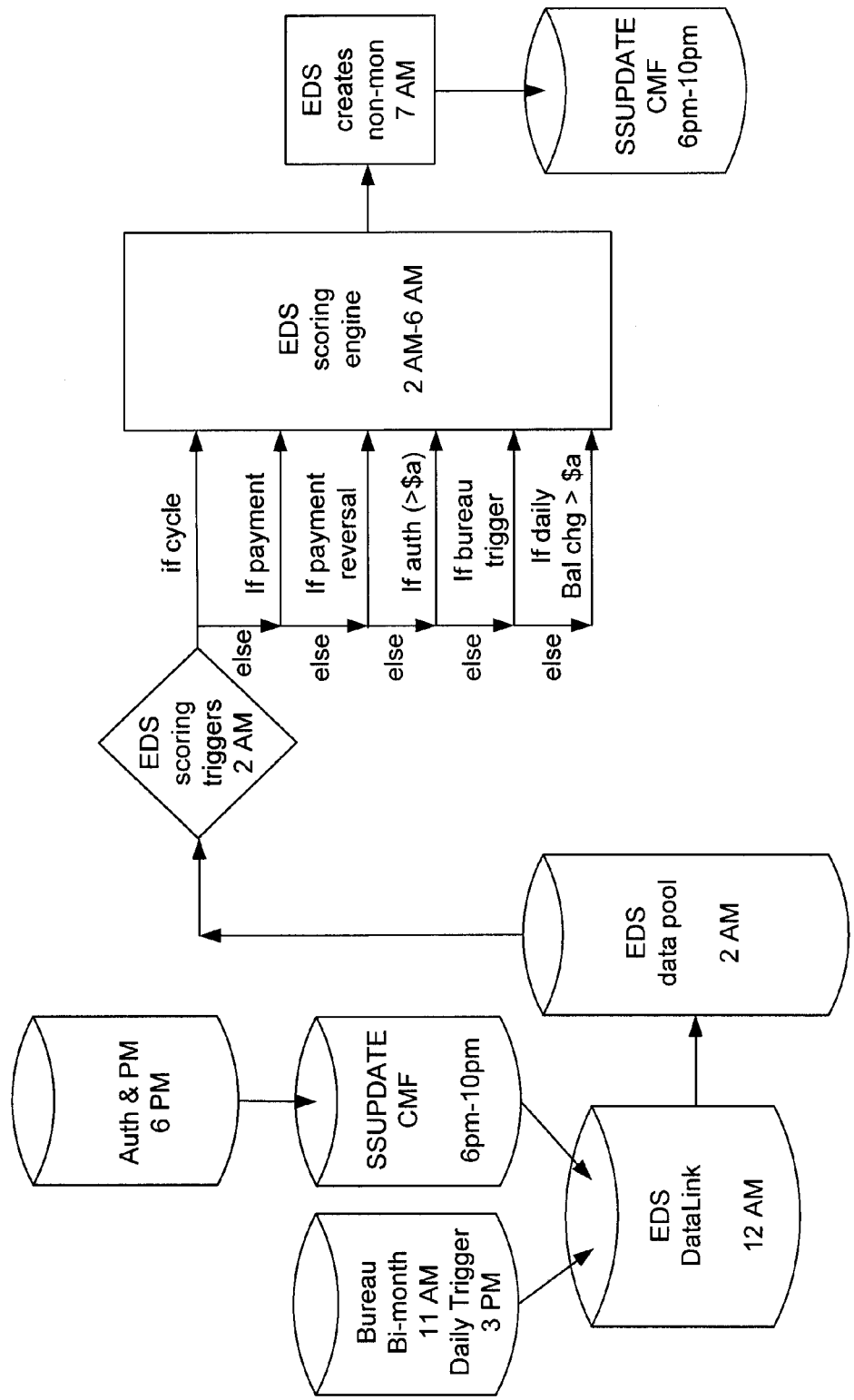
FIG. 6 shows an example of the timing of data processing according to an exemplary embodiment of the invention.

FIG. 6 illustrates an example of the timing of a daily calculation according to an exemplary embodiment of the invention. As shown in FIG. 6, Authorization ("Auth") data from authorized credit card transactions and posted monetary ("PM") data are received at 6 pm by a routine which updates the account history data set (also sometimes referred to as the cardholder master file (CMF)). At 11 am, the credit history data set (e.g., "bureau bi-month") is received, and at 3 pm the significant events data set (e.g., "daily trigger") is received. All the data is held until 2 am, at which time triggers are evaluated to determine which accounts should be scored. The accounts which have been triggered for scoring are scored from 2 am to 6 am. Thus, by 6 am, an up to date score is obtained for evaluation of whether and to what extent to extend credit to each account.

While the foregoing description includes details and specific examples, it is to be understood that these have been included for purposes of illustration only, and are not to be interpreted as limitations of the present invention. Modifications to the embodiments described above can be made without departing from the spirit and scope of the invention, which is intended to be encompassed by the following claims and their legal equivalents.

What is claimed is:

1. A computer implemented method for evaluating current creditworthiness of a current account holder of a credit account comprising the steps of:
   determining, by at least one computer processor, at least once a day, whether a first data set relating to the current creditworthiness of the current account holder has been received from a credit reporting organization;
   determining, by the at least one computer processor, at least once a day, whether a second data set relating to transaction activity of the credit account has been received;
   periodically receiving, by the at least one computer processor, from a credit reporting organization a third data set relating to the creditworthiness of the account holder;
   periodically receiving, by the at least one computer processor, a fourth data set relating to the historical activity of the credit account;
   using the first and second data sets, by the at least one computer processor, to the extent they have been received, and the third and fourth data sets to determine a measure of creditworthiness;
   defining, by the at least one computer processor, a plurality of account holder segments based on at least one characteristic of the account holders; and
   defining, by the at least one computer processor, at least one risk model for each of the plurality of account holder segments;
   wherein the at least one computer processor is located in at least one computing device, the computing device being communicatively coupled to a network;
   wherein determining a subsequent measure of creditworthiness is carried out based on the at least one risk model associated with the plurality of account holder segments by calculating a risk score.

2. The method of claim 1, wherein the third data set is received on a bi-monthly basis, and the fourth data set is received on a monthly basis.

3. The method of claim 1, further comprising the steps of:
   evaluating, by the at least one computer processor, at least one parameter in the first, second, third, or fourth data sets to determine whether a triggering event has taken place; and
   conditioning the step of determining the measure of creditworthiness on the occurrence of the triggering event.

4. The method of claim 3, wherein the triggering event comprises one of: (a) a receipt of payment, and (b) a transaction greater than a predetermined amount, or (c) any event reported in the first data set.

5. The method of claim 1, further comprising the steps of:
   creating, by the at least one computer processor, an account transactions profile based on the second data set;
   creating, by the at least one computer processor, a credit history profile based on the third data set;
   creating, by the at least one computer processor, an account history profile based on the fourth data set; and
   inputting, by the at least one computer processor, the account transactions profile, the credit history profile, and the account history profile into a scoring engine to determine the measure of creditworthiness.

6. The method of claim 1, further comprising the steps of:
   representing, by the at least one computer processor, a plurality of values in the fourth data set as a single value; and
   using, by the at least one computer processor, the single value in determining the measure of creditworthiness.

7. The method of claim 6, wherein the step of representing is carried out using a weighted average.

8. A computer implemented system for evaluating current creditworthiness of a current account holder of a credit account comprising:
   a computer based network;
   at least one server, wherein the at least one server is communicatively coupled to the computer based network and the at least one server comprises:
   means for determining, at least once a day, whether a first data set relating to the current creditworthiness of the current account holder has been received from a credit reporting organization;
   means for determining, at least once a day, whether a second data set relating to transaction activity of the credit account has been received;
   means for periodically receiving from a credit reporting organization a third data set relating to the creditworthiness of the account holder;
   means for periodically receiving a fourth data set relating to the historical activity of the credit account;

means for determining a measure of the creditworthiness using the first and second data sets, to the extent they have been received, and the third and fourth data sets;

means for defining a plurality of account holder segments based on at least one characteristic of the account holders; and means for defining at least one risk model for each of the plurality of account holder segments;

wherein determining a subsequent measure of creditworthiness is carried out based on the at least one risk model associated with the plurality of account holder segments by calculating a risk score.

9. A computer implemented method of determining current creditworthiness of a current account holder comprising the steps of:

receiving, by at least one computer processor, a credit history data set from a credit reporting organization on a periodic basis;

receiving, by the at least one computer processor, an account history data set on a periodic basis;

receiving, by the at least one computer processor, a significant events data set from a credit reporting organization at least once a day;

receiving, by the at least one computer processor, an account transactions data set at least once a day; and determining, by the at least one computer processor, a measure of creditworthiness based on the credit history data set, the account history data set, the significant events data set, and the account transactions data set;

wherein the at least one computer processor is located in at least one computing device, the computing device being communicatively coupled to a network.

10. A computer implemented method of determining current creditworthiness of a current account holder comprising the steps of:

receiving, by at least one computer processor, a credit history data set from a credit reporting organization on a periodic basis;

receiving, by the at least one computer processor, an account history data set on a periodic basis;

determining, by the at least one computer processor, at least once a day, whether a third data set relating to the creditworthiness of the account holder has been received;

using, by the at least one computer processor, the credit history data set, the account history data set, and the third data set to determine a measure of the creditworthiness of the account holder;

defining, by the at least one computer processor, a plurality of account holder segments based on at least one characteristic of the account holders; and defining, by the at least one computer processor, at least one risk model for each of the plurality of account holder segments;

wherein the at least one computer processor is located in at least one computing device, the computing device being communicatively coupled to a network;

wherein determining a subsequent measure of creditworthiness is carried out based on the at least one risk model associated with the plurality of account holder segments by calculating a risk score.

11. The method of claim 10, wherein the third data set comprises an account transactions data set.

12. The method of claim 10, wherein the third data set comprises a significant events data set received from a credit reporting organization.

13. A computer implemented method of determining current creditworthiness of a current account holder comprising the steps of:

receiving, by at least one computer processor, a credit history data set from a credit reporting organization on a periodic basis;

receiving, by the at least one computer processor, an account history data set on a periodic basis;

determining, by the at least one computer processor, at least once a day, whether a third data set relating to the creditworthiness of the account holder has been received;

using, by the at least one computer processor, the credit history data set, the account history data set, and the third data set to determine a measure of the creditworthiness of the account holder; and defining, by the at least one computer processor, at least one risk model that is run on a periodic basis;

wherein the at least one computer processor is located in at least one computing device, the computing device being communicatively coupled to a network;

wherein determining a subsequent measure of creditworthiness is carried out based on the at least one risk model associated by calculating a risk score;

wherein the third data set comprises an account transactions data set; and wherein the third data set comprises a significant events data set received from a credit reporting organization.

* * * * *